US008665291B2

(12) United States Patent
Zalewski

(10) Patent No.: US 8,665,291 B2
(45) Date of Patent: Mar. 4, 2014

(54) SYSTEM AND METHOD OF DISPLAYING MULTIPLE VIDEO FEEDS

(75) Inventor: Gary Zalewski, Oakland, CA (US)

(73) Assignee: Sony Computer Entertainment America LLC, San Mateo, CA (US)

(*) Notice: Subject to any disclaimer, the term of this patent is extended or adjusted under 35 U.S.C. 154(b) by 154 days.

(21) Appl. No.: 12/836,044

(22) Filed: Jul. 14, 2010

(65) Prior Publication Data

US 2010/0277485 A1    Nov. 4, 2010

Related U.S. Application Data

(63) Continuation-in-part of application No. 11/732,830, filed on Apr. 3, 2007.

(60) Provisional application No. 60/788,663, filed on Apr. 3, 2006, provisional application No. 61/225,533, filed on Jul. 14, 2009.

(51) Int. Cl.
*G06F 15/16* (2006.01)

(52) U.S. Cl.
USPC .......................................... 345/590; 345/502

(58) Field of Classification Search
USPC ................................................. 345/502, 590
See application file for complete search history.

(56) References Cited

U.S. PATENT DOCUMENTS

| 4,562,463 A | 12/1985 | Lipton |
| 5,554,251 A | 9/1996 | Watanabe et al. |
| 5,619,219 A | 4/1997 | Coteus et al. |
| 5,821,989 A | 10/1998 | Lazzaro et al. |
| 5,867,210 A | 2/1999 | Rod |
| 6,188,442 B1 | 2/2001 | Narayanaswami |
| 6,400,394 B1 | 6/2002 | Kim et al. |

(Continued)

FOREIGN PATENT DOCUMENTS

| DE | 19533767 A1 | 3/1997 |
| FR | 2 814 965 | 4/2002 |

(Continued)

OTHER PUBLICATIONS

PCT Notification of Transmittal of the International Search Report and the Written Opinion of the International Search Authority, or the Declaration for PCT/US 10/41343, mailed Aug. 30, 2010, 13 pages.

(Continued)

*Primary Examiner* — Sath V Perungavoor
*Assistant Examiner* — Jeffery Williams
(74) *Attorney, Agent, or Firm* — Lerner, David, Littenberg, Krumholz & Mentlik, LLP

(57) ABSTRACT

Respective video feeds are provided to at least two viewers using a common display. The display is controlled to simultaneously display an image from a first video feed and an image from a second video feed. The image from the first video feed is displayed within a first wavelength band and the image from the second video feed is displayed within a second wavelength band, and the first and second wavelength bands are distinct. A first filter is selective for transmitting the first wavelength band and not transmitting the second wavelength band. A second filter is selective for transmitting the second wavelength band and not transmitting the first wavelength band. Only the first video feed image is provided to a first viewer using the first filter, and only the second video feed image is provided to a second viewer using the second filter.

33 Claims, 17 Drawing Sheets

(56) References Cited

U.S. PATENT DOCUMENTS

| | | | |
|---|---|---|---|
| 6,956,576 | B1 | 10/2005 | Deering et al. |
| 7,139,042 | B2 | 11/2006 | Nam et al. |
| 2001/0043213 | A1 | 11/2001 | Buck et al. |
| 2002/0105483 | A1 | 8/2002 | Yamazaki et al. |
| 2002/0122585 | A1 | 9/2002 | Swift et al. |
| 2002/0196332 | A1 | 12/2002 | Lipton et al. |
| 2003/0199316 | A1 | 10/2003 | Miyamoto et al. |
| 2004/0056948 | A1 | 3/2004 | Gibson |
| 2004/0109093 | A1 | 6/2004 | Small-Stryker |
| 2005/0046700 | A1* | 3/2005 | Bracke ............ 348/218.1 |
| 2006/0203339 | A1 | 9/2006 | Kleinberger et al. |
| 2006/0214875 | A1* | 9/2006 | Sonehara ............ 345/8 |
| 2007/0033531 | A1 | 2/2007 | Marsh |
| 2007/0263003 | A1* | 11/2007 | Ko et al. ............ 345/502 |
| 2008/0043209 | A1 | 2/2008 | Widdowson et al. |

FOREIGN PATENT DOCUMENTS

| | | |
|---|---|---|
| JP | 9-135400 A | 5/1997 |
| WO | 00/01456 | 1/2000 |
| WO | 03/003750 | 1/2003 |

OTHER PUBLICATIONS http://faculty.augie.edu/~pchanavan/speech/Chapter6.ppt; Perry C. Hanavan; Chapter 6, Vocal Mechanism.

http://sail.usc.edu/publications/LePoNa_kidsAcous_JASA1999. pdf; Kazuo Hiyane and Jun Iio, Mitsubishi Research Institute, Inc.; RWCP Sound Scene Database in Real Acoustical Environments Non-Speech Sound Recognition With Microphone Array, Copyright 1998-2001.

PCT Notification of Transmittal of the International Search Report and the Written Opinion of the International Searching Authority, or the Declaration for PCT/US2007/008343, Sep. 20, 2007, 13 pages.

Richard J. Campbell and Patrick J. Flynn; A Survey of Free-Form Object Representation and Recognition Techniques; copyright 2001.

Sungbok Lee, Alexandros Potamianos, and Shrikanth Narayanan; Acoustics of Children's Speech: Developmental Changes of Temporal and Spectral Parameters, J. Acoust. Soc. Am. 105 (3), Mar. 1999.

Unreal Tournament 2004 for Windows: Product Reviews, Apr. 3, 2004.

www-ccrma.stanford.edu/~pdelac/154/m154paper.htm; Pitch Detection Methods Review (printed on Feb. 14, 2006).

* cited by examiner

SYSTEM AND METHOD OF DISPLAYING MULTIPLE VIDEO FEEDS

CROSS-REFERENCE TO RELATED APPLICATIONS

This application is a continuation-in-part of prior U.S. patent application Ser. No. 11/732,830 filed Apr. 3, 2007, which claims the benefit of the filing date of U.S. Provisional Patent Application No. 60/788,663 filed Apr. 3, 2006, the disclosure of which is hereby incorporated herein by reference. This application claims the benefit of the filing date of U.S. Provisional Patent Application No. 61/225,533 filed Jul. 14, 2009, the disclosure of which is hereby incorporated herein by reference.

BACKGROUND OF THE INVENTION

The present invention relates to systems that incorporate a display, such as are used as television or video monitors, computer monitors, or game system displays.

Presently, most displays are only able to provide one video, television program, game, etc. to all viewers of that display. As an example, all players of a given video game view the same images on the monitor, and as a result, different visual information cannot be provided to different players unless a more complex and more expensive type of display is used, such as a head mounted monitor.

Similarly, present displays that can provide more than one television program, game, or video at the same time require all viewers to view images from each of the displayed television programs, games, or videos, such as by splitting the display screen image or by providing a picture within a picture. Moreover, the audio portion of only one such television program, game, or video can be provided at a time for that audio portion to be audible.

It is therefore desirable to provide a "screen sharing" system in which two or more viewers using the same display can each be provided with different images on the display in a manner that does not require each viewer to also view the images intended for another viewer. It is also desirable to provide system that may be configured to provide each user who is "sharing" a screen with another user the ability to receive the audio portion associated with the images or content being viewed by that user.

SUMMARY OF THE INVENTION

In one aspect, the invention relates to an apparatus for providing respective video feeds to at least two viewers using a common display and being connectable to the display. The apparatus includes a control unit operable to control the display to display an image from a first video feed and an image from a second video feed, wherein the image from the first video feed is displayed within a first wavelength band and the image from the second video feed is displayed within a second wavelength band, wherein the first and second wavelength bands are distinct such that a first of the viewers viewing the display using a first filter passing through the first wavelength band and not passing the second wavelength band views only the image of the first video feed and a second of the viewers viewing the display using a second filter passing through the second wavelength band and not passing the first wavelength band views only the image of the second video feed.

In various aspects of the forgoing apparatus: the first wavelength includes red light and the second wavelength band includes blue light; the control unit includes a device selected from the group consisting of a set top box, a game unit, and a video player; the control unit includes a video processor, ASIC, or a general purpose processor executing instructions in accordance with the functions described herein; the first video feed is a first video game signal and the second video feed is a second video game signal.

Another aspect of the invention relates to a system for providing respective video feeds to at least two viewers. The system includes a video output to a display, a first device that passes through a first range of wavelengths and attenuates at least a portion of a second range of wavelengths (the first and second wavelength ranges having different bounds), a second device that passes through a second range of wavelengths and attenuates at least a portion of the first range, and a processor that simultaneously or alternately displays an image from a first video feed and an image from a second video feed on the display. At least portions of the image from the first video feed are within the first range and at least portions of the image from the second video feed are within the second range. To a user viewing the display with the first device, the first video feed will appear more prominent than the second video feed (indeed, the user may not be able to discern the second video feed at all). To a user viewing the display with the second device, the second video feed will appear more prominent than the first video feed (indeed, the user may not be able to discern the first video feed at all). The first and second devices may comprise glasses with optical filters.

In still another aspect of the invention, a method is provided. The method comprises: receiving a first and second video; processing each video such that the images of the first video do not include a second range of colors and the images of the second video do not include a first range of colors, and; displaying each video substantially simultaneously on the same display; wherein a first user viewing the display through a first optical filter will have difficulty discerning the second video and a second user viewing the display through a second optical filter will have difficulty discerning the first video.

Yet further, the foregoing filters may comprise LCDs that shutter in synchronization with feeds that are alternatively displayed on the display and contain images having wavelengths that correspond with the filters.

The foregoing aspects, features and advantages of the present invention will be further appreciated when considered with reference to the following detailed description and accompanying drawings.

DETAILED DESCRIPTION

The present invention provides for the use of a single monitor to present respective video feeds to two or more viewers in a manner that allows each viewer to only see the images from the video feed intended for that viewer. The invention also allows each viewer to only hear the sounds associated with that video feed.

Figure 1:
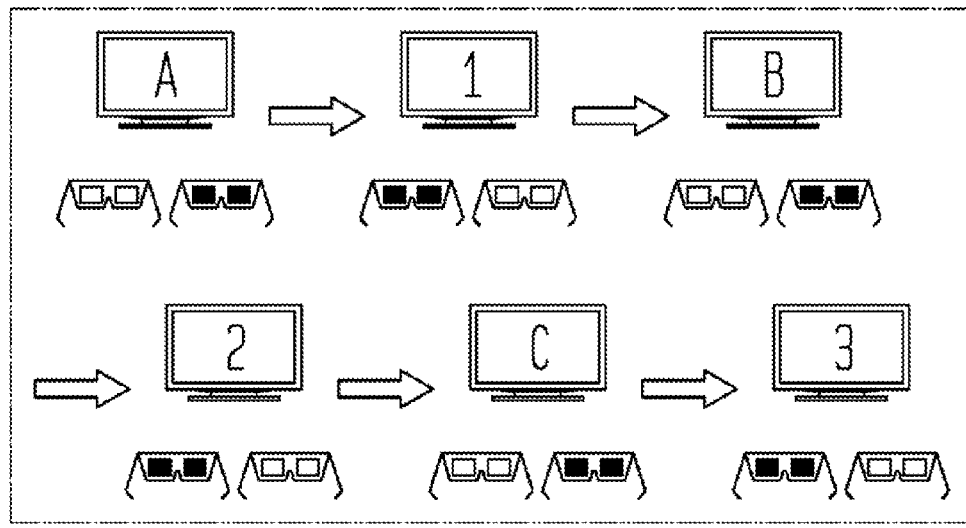
FIG. 1 is a diagram depicting an example of a display and associated pairs of LCD shutter glasses that operate in accordance with an aspect of the invention.

FIG. 1 illustrates an example of the invention in which a first video feed comprised of frames A, B, C, . . . and a second video feed comprised of frames 1, 2, 3, . . . are shown on the same monitor. The monitor alternately displays an image from each video feed, resulting in the displayed sequence of images A, 1, B, 2, C, 3, . . . shown in the upper portion of FIG. 2.

A first shuttered filter, such as the leftmost of the two pairs of LCD shutter glasses shown repeatedly in FIG. 1, is synchronized to the frames of first video feed. The first shuttered filter is open when the frames of the first video feed are shown on the monitor and is shuttered when the frames of the second video feed are shown on the monitor. An individual viewing the monitor through the first shuttered filter, e.g., by wearing the leftmost pair of LCD shutter glasses, would therefore only see the frames of the first video feed and would not see the frames of the second video feed, as shown in the leftmost bottom portion of FIG. 2.

A second shuttered filter, such as the rightmost of the two pairs of LCD shutter glasses repeatedly shown in FIG. 1, is synchronized to the frames of the second video feed. The second shuttered filter is open when the frames of the second video feed are shown on the monitor and is shuttered when the frames of the first video feed are shown on the monitor. Thus, an individual viewing the monitor through the second shuttered filter, e.g., by wearing the rightmost pair of LCD shutter glasses, would therefore only see the frames of the second video feed and would not see the frames of the first video feed, as shown in the rightmost bottom portion of FIG. 2.

The lenses of a pair of LCD shutter glasses are preferably either both open or both shuttered at the same time and are synchronized to the images from one of the displayed video feeds to allow the wearer to view the images from that video feed.

Each viewer may also be provided with a speaker that emits only the audio signals for the video feed provided to that viewer. A first audio signal associated with the first video feed is provided to the viewer of the first video feed, and a second audio signal associated with the second video feed is provided to the viewer of the second video feed. As an example, each pair of the LCD shutter glasses shown in FIGS. 1 and 2 may be provided with a headphone or earphone that permits the wearer to hear the sounds for the video feed being viewed by the wearer without interference from the sounds provided to a viewer of another video feed.

Figure 5:
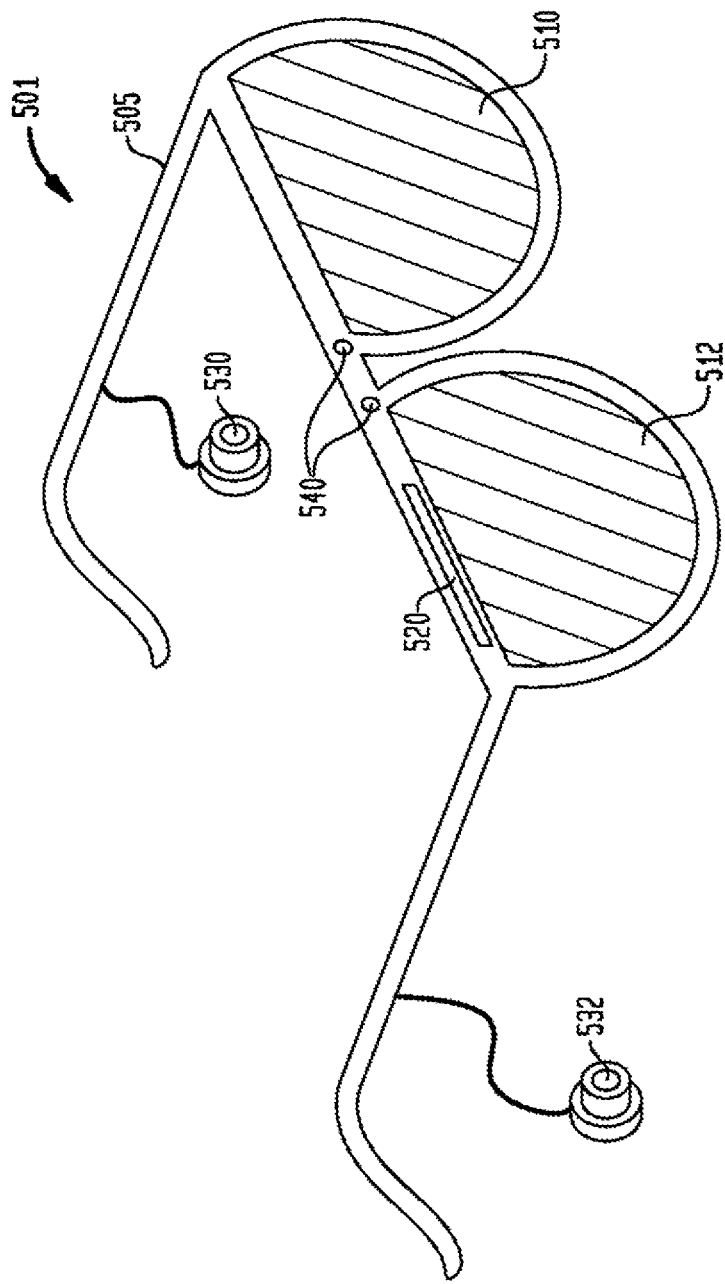
FIG. 5 is an isometric view of glasses and headphones in accordance with an aspect of the invention.

Glasses 501 in accordance with an aspect of the present invention are shown in FIG. 5. The glasses may include a frame 505 for holding a left LCD eyeglass lens 510 and a right LCD eyeglass lens 512. As noted above, each eyeglass lens 510 and 512 can be rapidly and selectively blackened so as to prevent the wearer from seeing through the lens. Left and right earphones 530 and 532 are also preferably connected to the frame 505. An antenna 520 for sending and receiving wireless information may also be included in or on the frame 505. The glasses may be tracked via any means to determine if the glasses are looking toward the screen. For example, the front of the glasses may also include one or more photo detectors 540 for detecting the orientation of the glasses towards the monitor.

The alternating displays of images from the video feed can be provided using various known techniques. It is preferred that screen 410 be configured to operate in a progressive scan mode for each video feed that is shared on the screen. However the present invention may also be configured to work with interlaced video, as described. For a standard television monitor, such as those using an interlaced NTSC or PAL format, the images of the two video feeds may be interlaced and the lines of an image from one video feed may be interleaved with the lines of an image from the other video feed. For example, the odd-numbered lines taken from an image from the first video feed are displayed, and then the even-numbered lines taken from an image from the second video feed are displayed.

For applications in which the images of one or more of the video feeds are to provide the appearance of continuous motion, the frequency at which the images of both video feeds are shown on the monitor must be greater than that which the human eye can perceive. Thus, the images from video feeds presented using interlacing/interleaving may be prone to flickering or poor resolution. As an alternative, the images from the two video feeds may be alternately presented on the monitor by flipping between two pages of video memory that store the two images, known as page flipping. Also, a progressive scanning monitor may be used in combination with page flipping.

Figure 6:
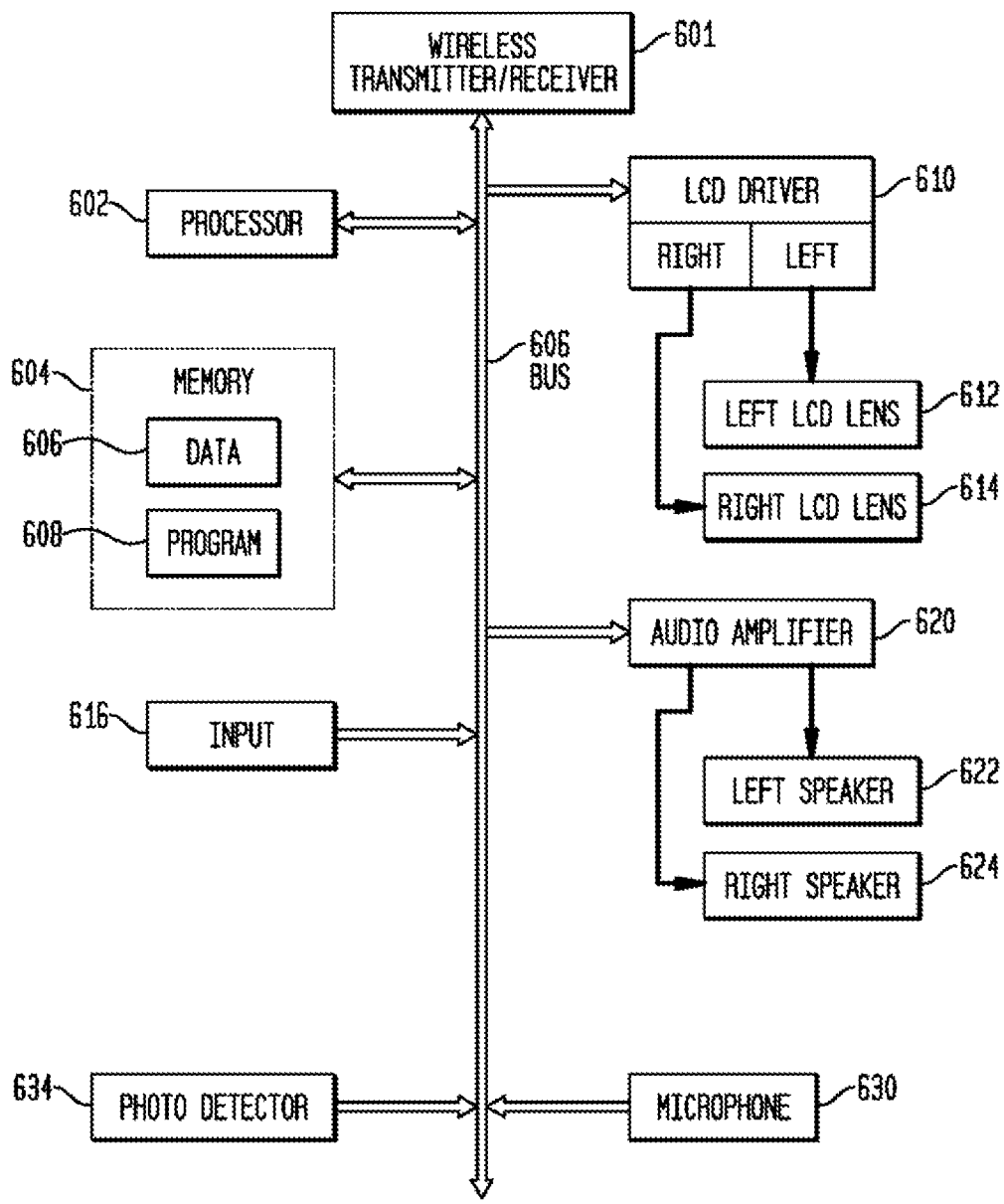
FIG. 6 is a system diagram of glasses in accordance with an aspect of the invention.

A system diagram of glasses in accordance with an aspect of the invention is shown in FIG. 6. The glasses may include a processor 602 which executes instructions from program 608 stored in memory 604. Memory 604 may also store data to be provided to, or output from, processor 602 as well as any other storage retrieval/storage element of the glasses. Processor 602, memory 604 and the other elements of the glasses may communicate with one another over a bus 606. Such other elements may include an LCD Driver 610 which provides a driver signal which selectively shutters left and right LCD lens 612 and 614. The LCD Driver may shutter each left and right LCD lens individually and at different times and durations, or together at the same time and duration.

The frequency at which the LCD lens are shuttered may be stored in advance in the glasses (e.g., based on the known frequencies of NTSC). Alternatively, the frequency may be selected via means of user input 616 (e.g., knobs or buttons to adjust or enter the desired frequency). Yet further, the desired frequency as well as the initial shutter start time, or other information indicating the time period during which the LCD lenses should be shuttered or not regardless of whether such time periods are at a set frequency and duration, may be transmitted to the glasses via wireless transmitter receiver 601 or any other input element. The wireless transmitter/receiver 601 may comprise any wireless transmitter, including a Bluetooth transmitter/receiver.

Audio amplifier 616 may also receive information from the wireless transmitter/receiver 601, namely, the left and right channels of audio to be provided to left speaker 622 or right speaker 624. The glasses may also include a microphone 630. The microphone 630 may be used in connection with games providing for voice communication; the voice signals may be transmitted to a game console or another device via wireless transmitter/receiver 601.

The glasses may also include one or more photo detectors 634. The photo detectors may be used to determine whether the glasses are oriented towards the monitor. For example, the photo detectors may detect the intensity of light hitting the photo detectors and transmit the information to processor 602. If the processor detects a substantial drop in light intensity, which may relate to the user looking away from the monitor, the processor may cease the shuttering of the lenses. Other methods of determining whether the glasses (and thus user) are oriented towards the monitor may also be used. For example, one or more cameras in lieu of photo detectors may be used and the captured images examined by processor 602 to determine whether the glasses are oriented towards the monitor. Just a few possible embodiments of using such a camera may include checking contrast levels to detect whether the camera is pointed at the monitor or attempting to detect brightness test patterns on the monitor. The device providing multiple feeds to the monitor may indicate the presence of such test patterns by transmitting information to processor 602 via wireless transmitter/receiver 601.

Figure 7:
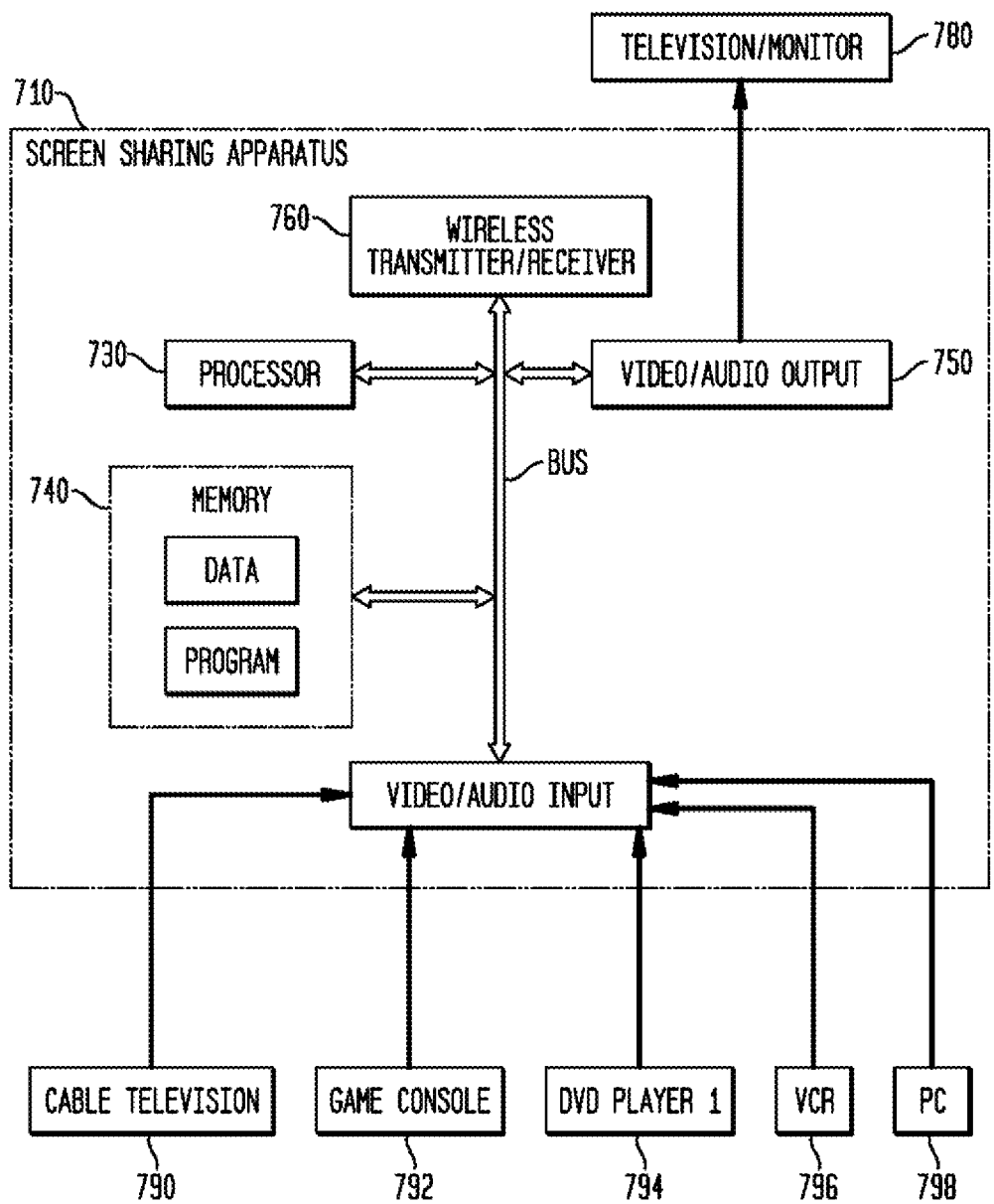
FIG. 7 is a system diagram of a screen sharing apparatus, in communication with a television or monitor and multiple inputs, in accordance with an aspect of the invention.

A system diagram of one aspect of a screen sharing apparatus 710 which provides the video to be displayed is illustrated in FIG. 7. A video/audio input 720 accepts two or more video and audio inputs such as but not limited to, and preferably in any combination, from: a cable television set top box 790, game console 792, DVD player 794, VCR 796 and a personal computer 798. Though it should be recognized for the purposes of this invention that a single video stream may represent two "video feeds" or video inputs. The single video stream can be a time division multiplexed sequence of video frames characterized by two or more video feeds or inputs. Also, the video inputs do not need to be sourced from multiple devices. Rather, one device may be capable of presenting two or more video inputs or video feeds.

With respect to the continuing example, A processor 730 retrieves and stores data in memory 740 and provides signals to the other elements of the screen sharing apparatus. Video/audio output 750 multiplexes a selected number of the video signals from the video inputs in a manner such that two or more of the video signals follow one another sequentially in rapid succession on a single video output signal to the television or monitor 780 (it being understood that such single video output signal may actually comprise multiple signals, including composite or color signals). Information related to the multiplexed signals may be transmitted via wireless transmitter/receiver 760 to the glasses. Such information may include the number of video inputs selected for multiplexing, the frequency of the multiplexing, the time at which a particular video signal is sent to television or monitor 780, an identifier of which video signal is being displayed at a particular time, and other information. The audio signal from the audio/video inputs 790-798 may also be transmitted wirelessly from the screen sharing apparatus 710 to the glasses.

Figure 8A:
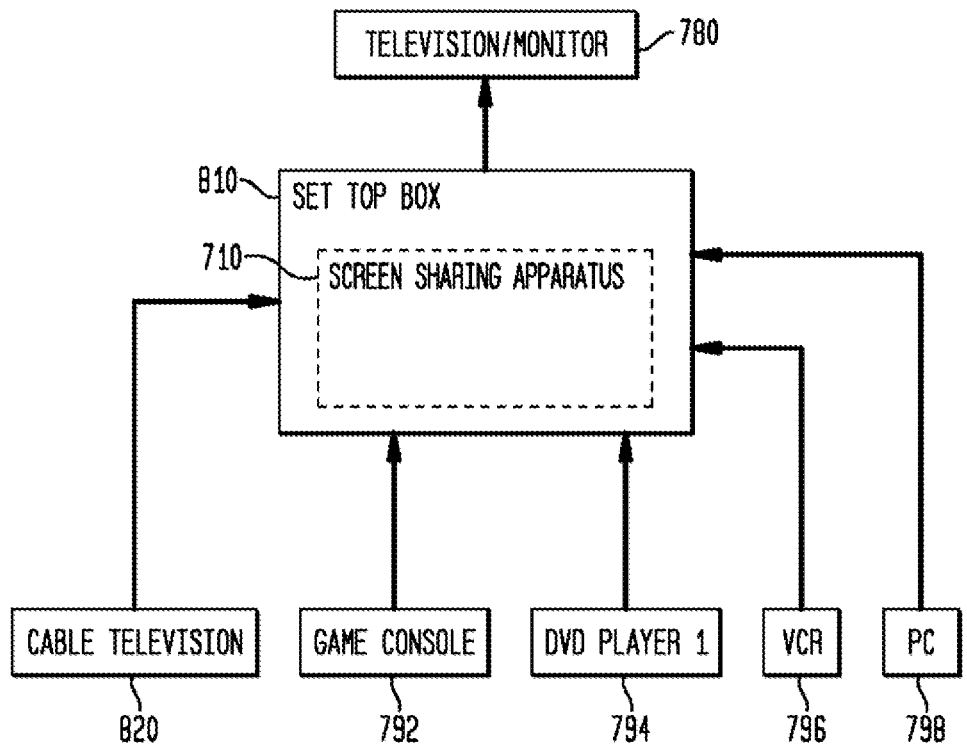
FIGS. 8A and 8B are system diagrams of a screen sharing apparatus contained in a set top box and game console, respectively.
Figure 8B:
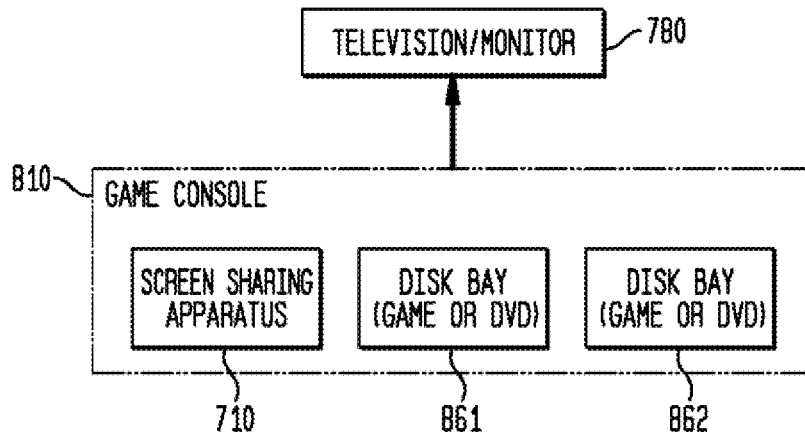

Although the screen sharing apparatus 710 is schematically illustrated as being separate from the television 780 and video inputs in FIG. 7, the apparatus may be located in a wide variety of devices. For example and as illustrated in FIG. 8A, the screen sharing apparatus 710 may be embedded in a set top box having multiple inputs. As shown in FIG. 8B, the screen sharing apparatus may also be contained in a game console having multiple internal audio/video sources, such as two disk bays 861, 862 (each capable of rendering content from a game or DVD).

Figure 2:
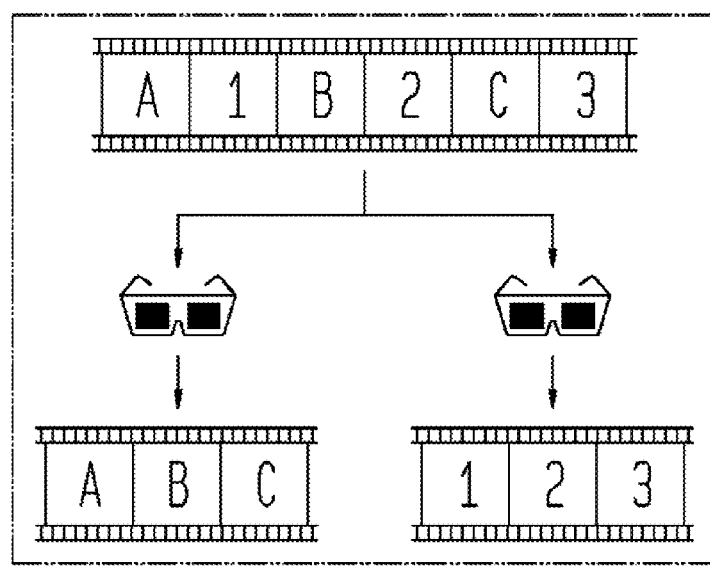
FIG. 2 is a diagram showing the sequence of frames presented by the display of FIG. 1 and showing the frames viewed by each wearer of a given pair of the LCD shutter glasses in accordance with an aspect of the invention.

Though only two video feeds and two shuttered filters are shown in FIGS. 1 and 2, the invention is also applicable to arrangements in which the monitor shows more than two video feeds and in which more than two synchronized, shuttered filters are used to allow viewing of each of the video feeds.

Figure 3A:
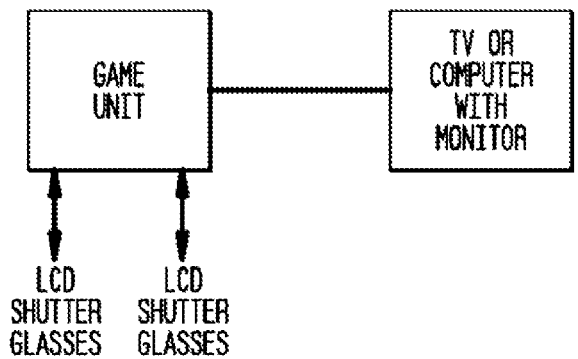
FIGS. 3A-3C are diagrams illustrating various embodiments of a system in accordance with an aspect of the invention.

FIG. 3A illustrate an embodiment of the invention used in a video game system. A game unit stores the software required for playing the video game and also controls the images delivered to the monitor of a television set or computer. The game unit provides two video feeds to the monitor and controls the monitor to alternately display images from the two video feeds, as described above with regards to FIGS. 1 and 2. The game unit is also connected to two or more pairs of LCD shutter glasses and synchronizes the shutter operation of each given pair of LCD shutter glasses to one of the video feeds. The connection between the game unit and the pairs of LCD shutter glasses may be a physical connection or may be a wireless connection, such as using the Bluetooth communication protocol.

Figure 9:
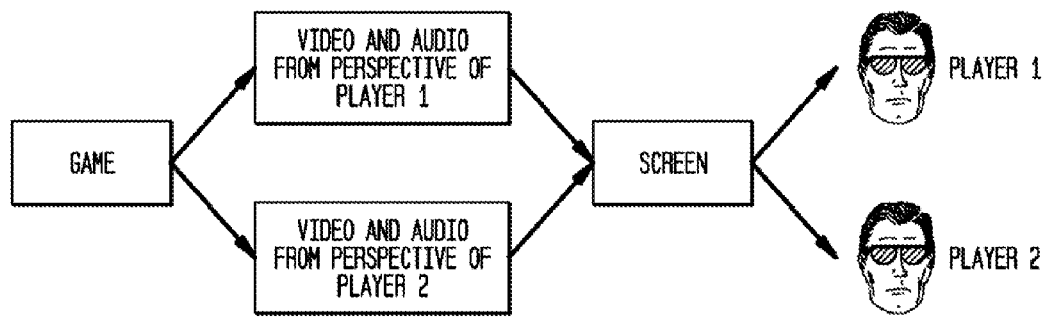
FIG. 9 is a functional diagram of audio/video content being simultaneously provided to multiple users in accordance with an aspect of the invention.

The embodiment shown in FIG. 3A, and FIG. 9, thus allows each player of a video game to participate in the game from that player's perspective. One of the video feeds provides a first player with a particular view of the activities of the game and may include visual information not provided to the other player. In a similar manner, the other video feed provides a second player with a different view of the same game that is suited to that player. Each player wears a pair of LCD shutter glasses that is synchronized to the images of one of the video feeds and only allows the player to view images of that video feed. Also, if headphones are provided for each player, the first and second players may each be provided with sounds and/or audio instructions not provided to the other player.

Figure 10:
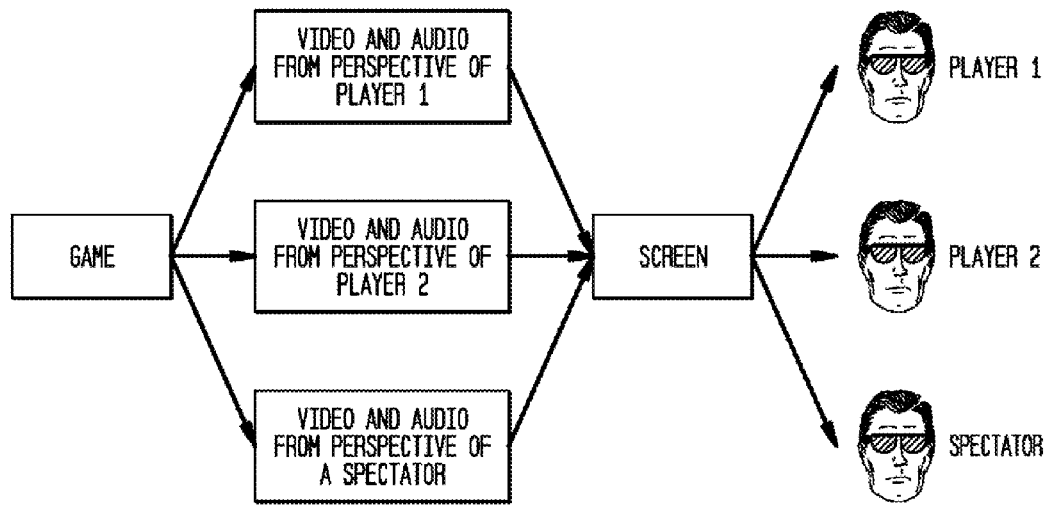
FIG. 10 is a functional diagram of audio/video content being simultaneously provided to multiple users in accordance with an aspect of the invention.

As a variation of this example and shown in FIG. 10, a third pair of LCD shutter glasses is added and is controlled by the game unit to provide the wearer with a spectator mode of the video game in which both views of the game may be seen. The third pair of LCD shutter glasses, for example, may provide one of the pair of shutter glasses with one of the video feeds and provide the other of the pair of shutter glasses with another of the video feeds in manner similar to that used in a 3D application, resulting in a combined view of the images from two video feeds.

Figure 12:
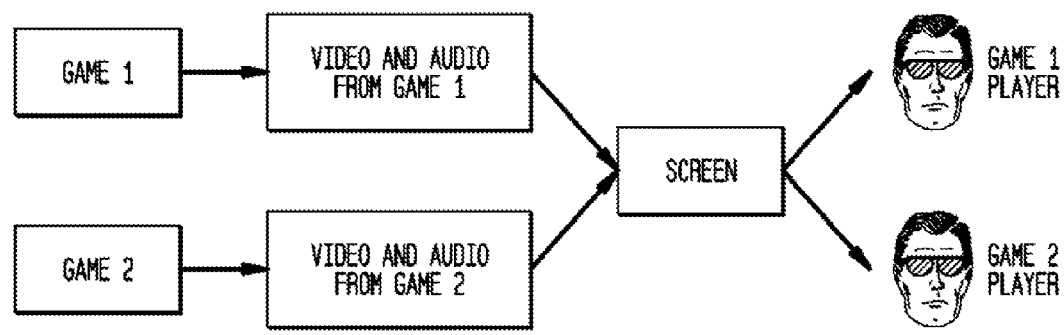
FIG. 12 is a functional diagram of different game content being provided to multiple users in accordance with an aspect of the invention.

As another example, and as illustrated in FIG. 12, the two video feeds may provide images of two respective video games. The game unit controls the monitor to alternately provide images from each perspective of the two video games and synchronizes the two pairs of LCD shutter glasses such that a particular pair of the LCD shutter glasses only provides a view of one of the video games. Using this arrangement, the two video games may be played concurrently by different players using the same game unit and monitor.

Figure 3B:
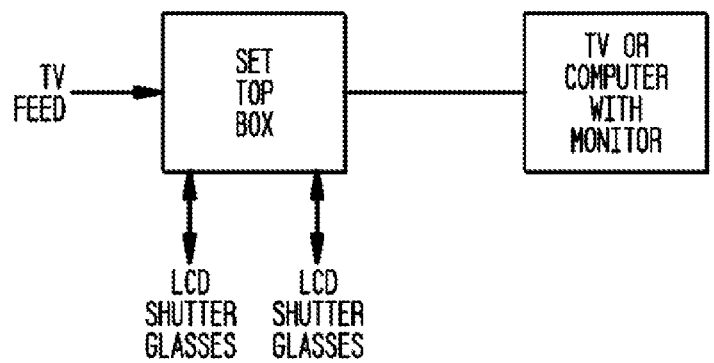
Figure 13:
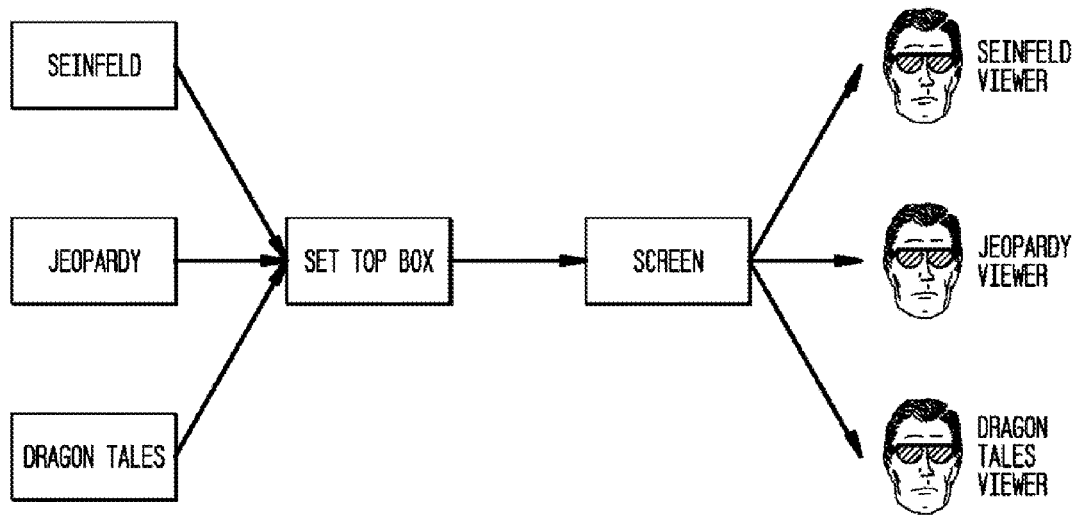
FIG. 13 is a functional diagram of different television channels being provided to multiple users in accordance with an aspect of the invention.

FIG. 3B and FIG. 13 show another embodiment of the invention in which a set top box receives various television channels (such as three channels showing the shows Seinfeld, Jeopardy and Dragon Tales, respectively) and/or videos and controls the monitor to alternately display images from each television programs and/or video. The set top box controls each of the LCD shutter glasses to allow its wearer to view only one of the programs and/or videos. The inclusion of headphones also allows each viewer to hear the audio portion of only the program or video being viewed. Using this arrangement, two or more individuals can watch and hear different television programs and/or videos at the same time and while in the same room and viewing the same monitor.

The invention may be used with any number of video feeds. For example, the set top box shown in FIG. 3B may be configured to receive four or more video feeds that are cyclically displayed on the monitor, and each of the video feeds is associated with one of four different pairs of LCD shutter glasses controlled by the set top box and synchronized to the display of its associated video feed.

Figure 3C:
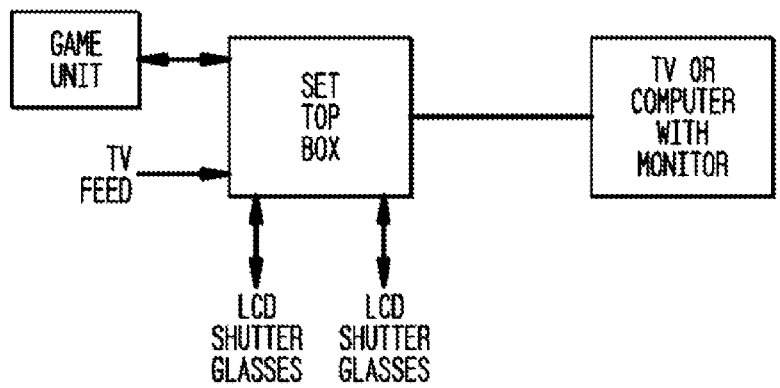
Figure 14:
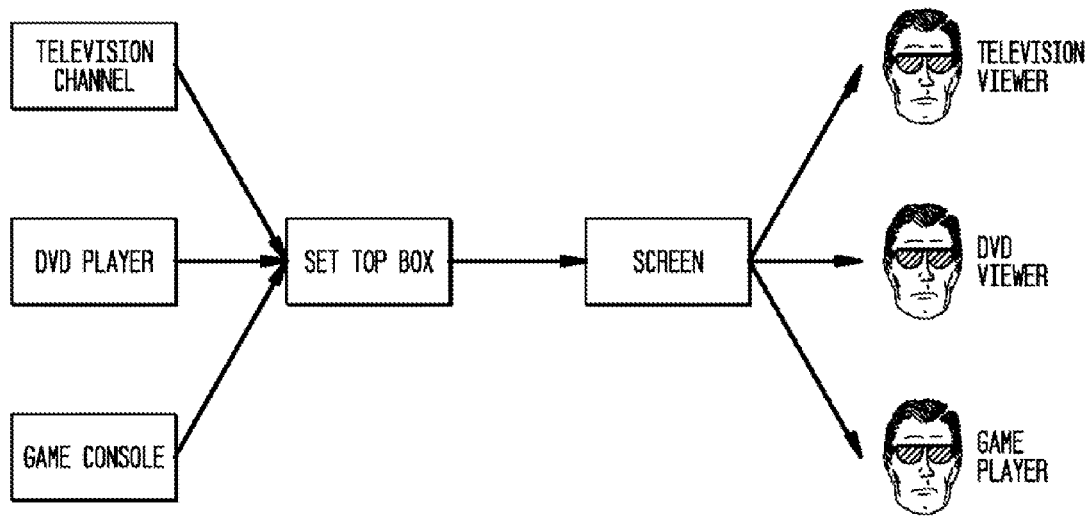
FIG. 14 is a functional diagram of different audio/visual content being provided to multiple users in accordance with an aspect of the invention.

FIG. 3C and FIG. 14 show a further embodiment of the invention in which a set top box receives various television channels and/or videos and is also connected to a game unit from which it receives a video game feed. The set top box controls the monitor to alternately display images from the video game and images from the television program or video. The control unit also synchronizes the shuttering of one of the pairs of LCD shutter glasses to permit its wearer to view the television program or video and synchronizes the shuttering of the other pair of LCD shutter glasses to permit its wearer to concurrently play the video game. Using this arrangement, an individual can watch and hear a television program or a video at the same time that another individual plays a video game with both individuals viewing the same monitor.

Figure 15:
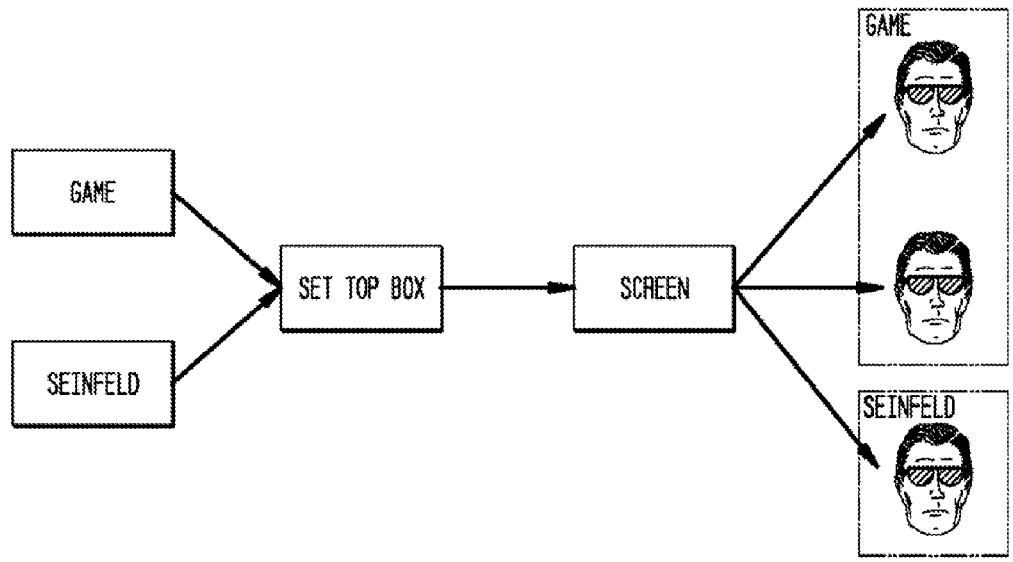
FIG. 15 is a functional diagram of game and television audio/visual content being provided to multiple users in accordance with an aspect of the invention.

In an alternative arrangement, and as shown in FIG. 15, the embodiment shown in FIG. 3C may include a third pair of LCD shutter glasses to permit two individuals to play the video game while, at the same time, a third person watches a television program or video on the same monitor. The two players of the video game may view the video game from the same perspective, in which case the set top box controls the monitor to alternately display the images from the video game and the images from the television program or video. The set top box synchronizes the shuttering of the two pairs of LCD shutter glasses worn by the video game players to the intervals during which the video game is displayed so that the two players view only the video game.

Figure 16:
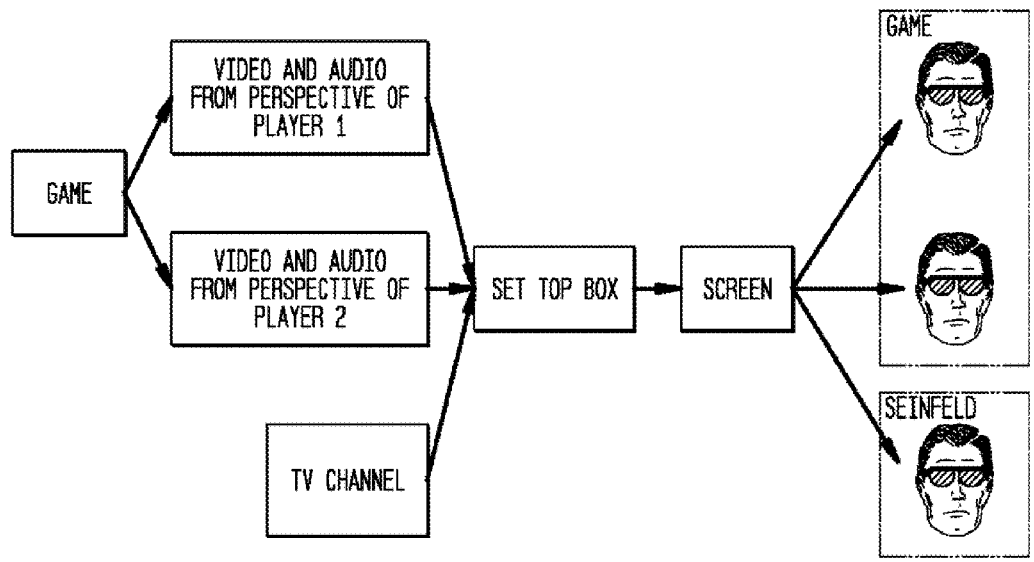
FIG. 16 is a functional diagram of game and television audio/visual content being provided to multiple users in accordance with an aspect of the invention.

As a further alternative as shown in FIG. 16 using the embodiment shown in FIG. 3C, each of the two video game players uses the monitor to view the video game from a different perspective than the other, and the third individual watches and hears the television program or video at the same time also using that monitor. The set top box controls the monitor to cyclically display, e.g., an image from the video game at a first perspective, an image from the video game at a second perspective, and an image from the television program or video. The set top box thus synchronizes the shuttering of the pairs of LCD shutter glasses to the images displayed on the monitor such that a wearer of one of the pairs of LCD shutter glasses plays the video game viewed from the first perspective, a wearer of another of the pairs of LCD shutter glasses plays the video game viewed from the second perspective, and a wearer of the third pair of LCD shutter glasses views the television program or video.

Figure 11:
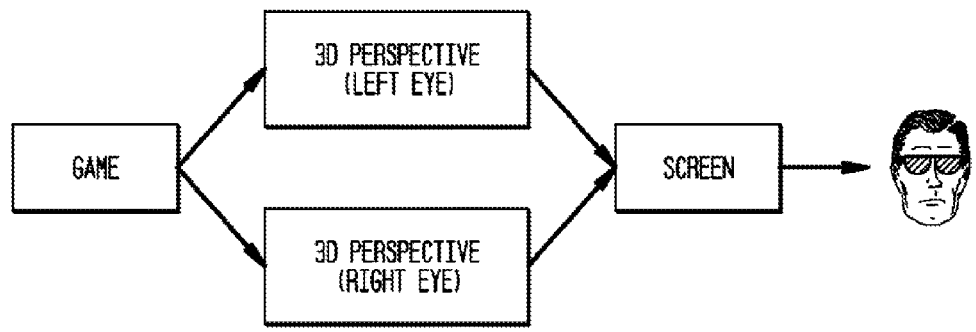
FIG. 11 is a functional diagram of 3-D content being provided to a user in accordance with an aspect of the invention.
Figure 17:
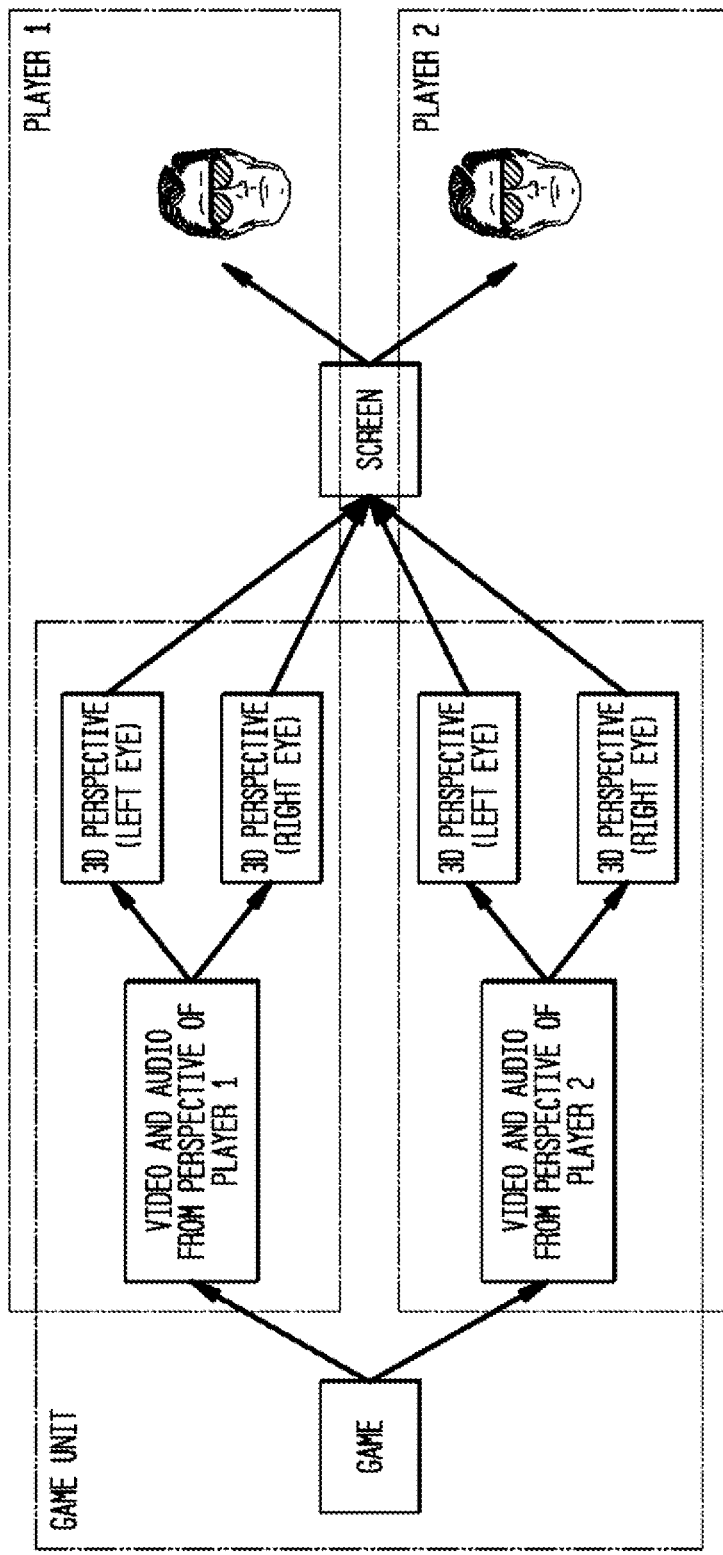
FIG. 17 is a functional diagram of game content, from the same game, being provided to users in 3-D and from perspectives particular to each user, in accordance with an aspect of the invention.

As shown in FIG. 11, the present invention may also provide one or more players of a video game to play the game with in three-dimensions (3D) view and/or permit one or more viewers to view the television program and/or video in 3D. As shown in FIG. 17, each player of a video game may view the game in 3D in addition to ach viewing the game from a different perspective that the other players. Using the arrangement shown in FIG. 3A, for example, the game unit may control the monitor to cyclically show, e.g., a left image frame at a first perspective, a right image frame at the first perspective, a left image frame at a second perspective, and a right image frame at the second perspective. To attain the 3D effect, the left and right shutters of each pair of LCD shutter glasses are synchronized to different displayed images. Thus, the left shutter of one of the pairs of LCD shutter glasses is synchronized to view the left image frame at the first perspective, and the right shutter of that pair of LCD shutter glasses is synchronized to view the right image frame at the first perspective. Similarly, the left shutter of another of the pairs of LCD shutter glasses is synchronized to view the left image frame at the second perspective, and the right shutter of that pair of LCD shutter glasses is synchronized to view the right image frame at the second perspective. As a result, each player of a video game views the game in 3D as well as from his or her particular perspective.

Figure 18:
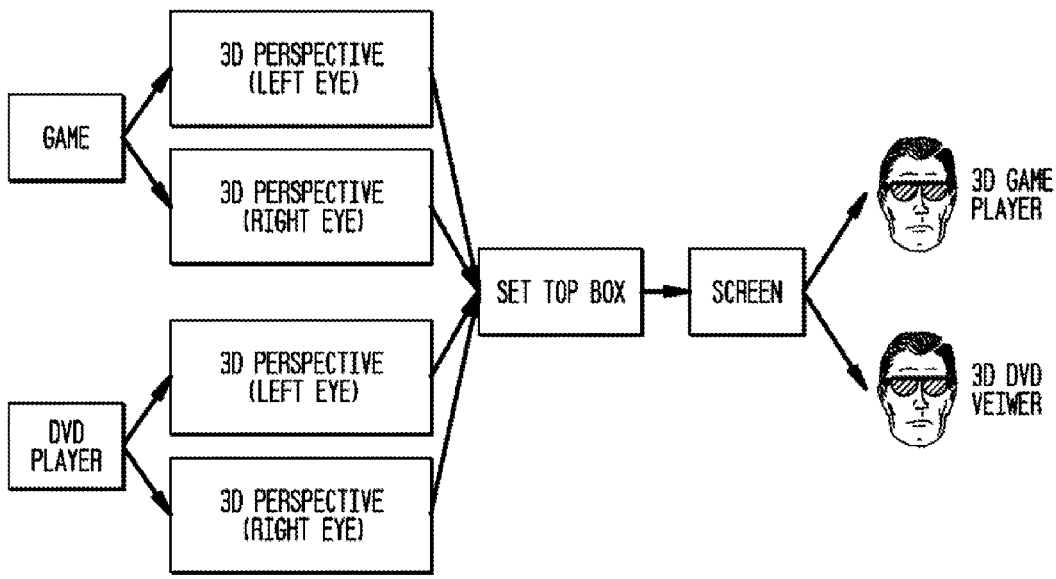
FIG. 18 is a functional diagram of game content being provided to a user in 3-D, and a movie (or other audio/visual content) being provided to a different user in 3-D, in accordance with an aspect of the invention.

As another example, two viewers may watch different television programs and/or videos in 3D at the same time and while viewing the same monitor, such as using the arrangement shown in FIG. 3B, or one may watch a television program or video in 3D while another plays a video game viewed in 3D from the same monitor, such as using the arrangement shown in FIG. 3C. The monitor is controlled to cyclically display, e.g., a left image frame from a television program or video, a right image frame from the television program or video, a left image frame from another television program or video or from a video game feed, and a right image frame from the another television program or video or from the video game feed. The left and right lens of each pair of LCD shutter glasses is thus synchronized such that each wearer views his or her respective television program, video, or video game in 3D. FIG. 18 schematically illustrates one viewer playing a 3D game and another viewer watching a 3D movie on the same screen.

Figure 19:
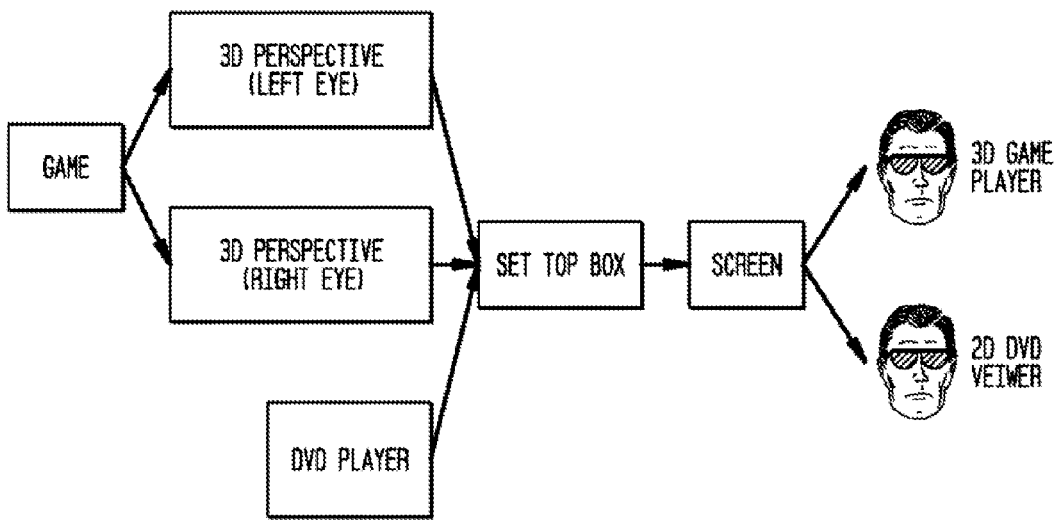
FIG. 19 is a functional diagram of game content being provided to a user in 3-D, and a movie (or other audio/visual content) being provided to a different user in 2-D, in accordance with an aspect of the invention.

In a further example, one or more individuals may play a video game in 3D and another individual may watch two-dimensional (2D) images of a television program and/or video at the same time and while viewing the same monitor, such as using the arrangement shown in FIG. 3C. FIG. 19 also schematically illustrates such an arrangement. The monitor is controlled to cyclically display a left image frame from the video game feed, a right image frame from the video game feed, and a frame from the television program or video. The left lens of one pair of LCD shutter glasses is synchronized to the timing of the left image frame from the video game feed and the right lens of the pair of LCD shutter glasses is synchronized to the timing of the right image frame from the video game feed so that the wearer views the video game in 3D. The left and right lenses of another pair of LCD shutter glasses are both synchronized to the timing of the frame from the television program or video and thus allow the wearer to view the 2D television program or video from the same monitor used to play the video game.

Figure 4:
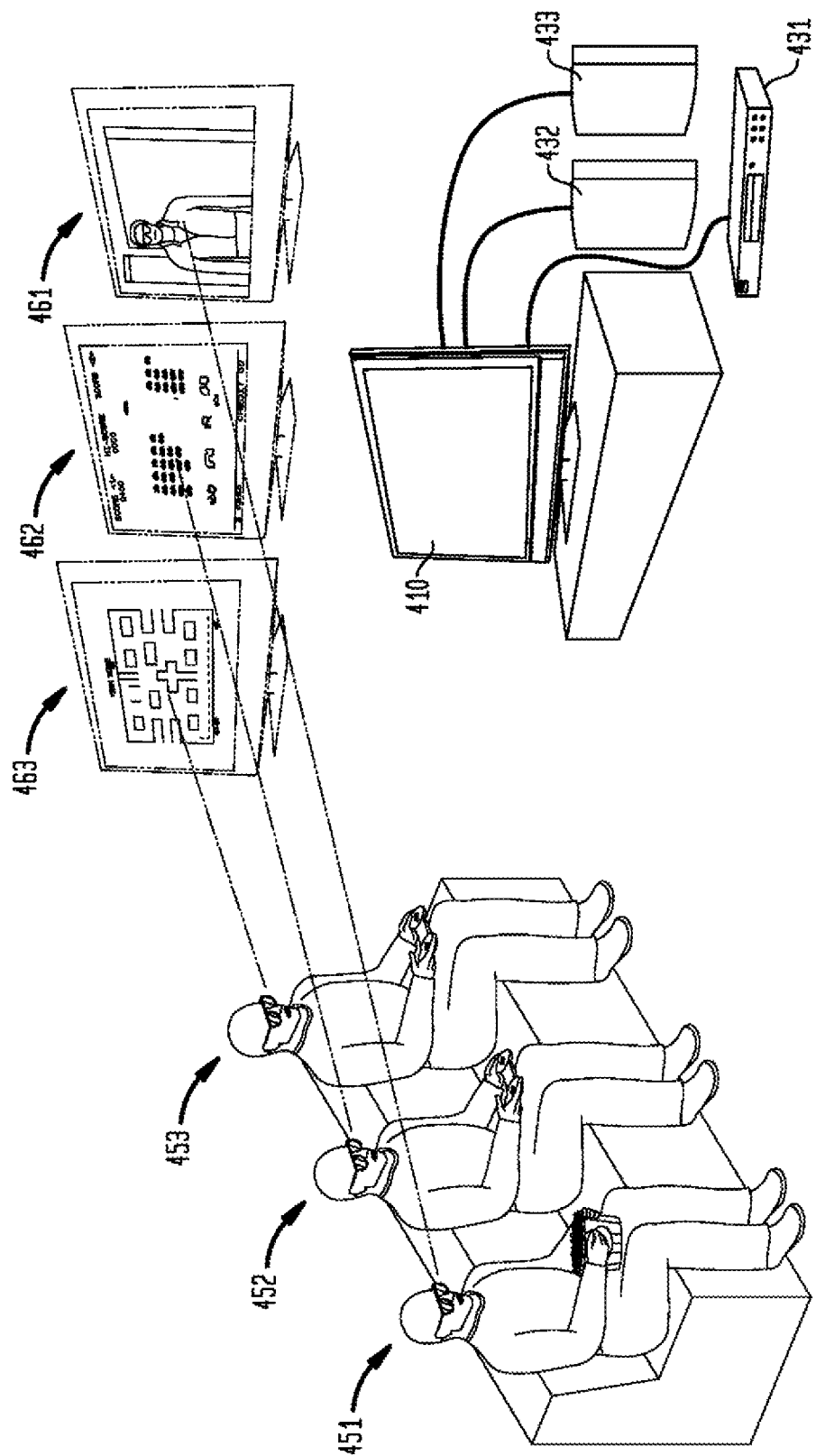
FIG. 4 is representational drawing of people watching different audio/video content on the same screen in accordance with an aspect of the invention.

FIG. 4 illustrates three people watching three different video entertainment programs. In one aspect of the invention, three people 451-452 are each wearing glasses, with headphones, in accordance with the present invention and watching the same television 410. Bravia® television 410 includes a screen sharing apparatus described above, and accepts three different video inputs, namely, two Sony Playstation game consoles 432, 433 and a DVD player 431. The television multiplexes the three different audio/video inputs together as described, and wireless transmits information regarding which visual input is being displayed at any particular time to the glasses. The first person's (451) glasses are shuttered such that he or she can only see through the glasses when the Terminator movie 461 (playing on DVD player 431) is being shown on the screen of television 410. The second person's (452) glasses are shuttered such that he or she can only see through the glasses when the MotorStorm game 462 (playing on Playstation console 432) is being shown on the same television 410. The third person's (453) glasses are shuttered such that he or she can only see through the glasses when the PacMan game 463 (playing on Playstation console 433) is being shown on the same screen. The audio corresponding with DVD player 431, and game consoles 432, 433 is also wireless transmitted to the glasses of persons 451, 452 and 453, respectively. In this manner, each person 451-453 can use a single television to listen and watch three different audio/video sources.

In addition to the above examples, the invention also enables the use of a common monitor to provide other combinations of video games, television programs, and videos together with other combinations of 2D or 3D presentations and/or different perspectives.

In accordance with another aspect of the present invention, a display simultaneously or alternately presents images from at least two video feeds, where the images of the respective video feeds are displayed within wavelength bands of electromagnetic radiation that are distinct from each other, and in which a wavelength band selective filter device is used that only permits the viewing of the images from the video feed displayed at wavelength(s) within the wavelength band that can pass through the filter device.

Figure 20:
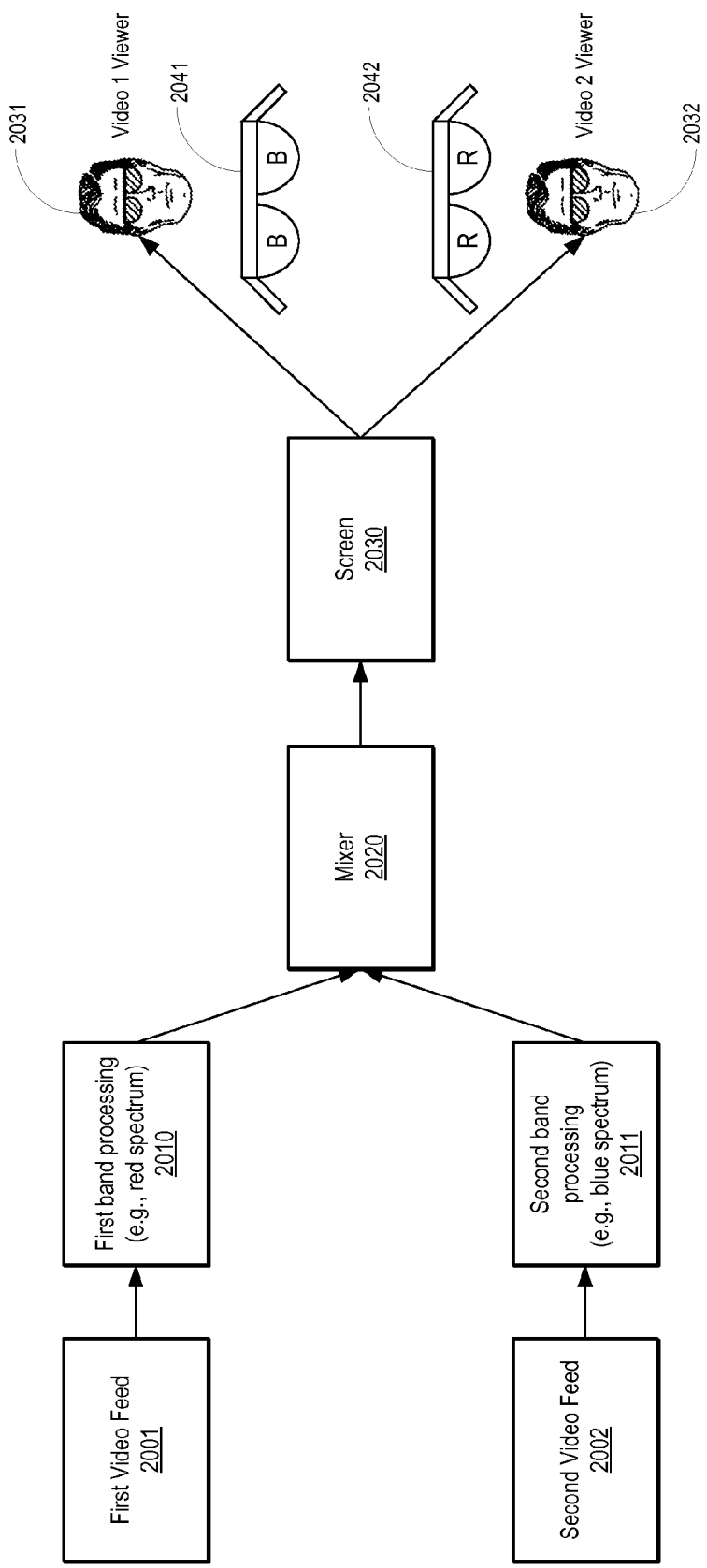
FIG. 20 is a functional diagram of two video feeds processed in accordance with bands of wavelength in accordance with an aspect of the invention.

FIG. 20 illustrates one aspect of the invention, where two different video feeds 2001-02 are processed in connection with two different bands of wavelength. The video feeds may comprise any of the feeds or other information described above in connection with the glasses that shutter. For the ease of illustration and not by limitation, the first band shall be referred to herein as the "red spectrum" and comprises visible wavelengths that are red or close to red, such as orange. For similar reasons, the second band shall be referred to herein as the "blue spectrum" and comprises visible wavelengths that are blue or close to blue such as cyan.

In one aspect, the system processes the first video feed such that all of its colors are shifted and limited within the first band of wavelengths. For example, colors in the first video feed 2001 that are red, green or the like may be shifted in accordance with first band processing 2010 into the red spectrum. Similarly, colors in the second video feed 2002 that are blue or cyan may be shifted in accordance with second band processing 2011 into the blue spectrum.

The color processing 2010-11 may be performed in a variety of ways. For example, pre-existing videos may be processed with the use of optical lenses that filter or translate the frequency of colors in pre-existing videos. It may also be applied on demand under the control of a control unit such as set top box, a game console or video player that outputs the video to a display via a video output and processes the video with a video processor, ASIC, or a general purpose processor executing instructions in accordance with the functions described herein. For example, the video feed may comprise a digitized video feed from a game console that is output to the display as a user plays a game. In that regard, a processor may analyze the color information associated with the pixels of each frame and modify the pixels so that they fall within the desired band. In still another aspect, the video feed is generated so as not to include colors falling outside of the band. For instance, if a game console is generating both video feeds, the game console may render images that only contain colors falling within the red spectrum.

The different video feeds may then be mixed together for display on the same screen 2030. For instance, if a game console is generating both video feeds, the processor may assign alternate pixels of the image to display either the first processed video feed or the second processed video feed. By way of example, if the first video feed includes a racing scene and the second video feed includes a fight scene, the screen may simultaneously display a red-hued racing scene interlaced with a blue-hued fight scene. Yet further, the frames from the feeds may be alternately shown in series, such that the system displays one entire frame of the first video feed on the screen, then an entire frame of the second video feed, then a frame of the first video feed followed by a frame of the second feed, and so on. The system may accommodate other techniques for combining two images together such as alpha-blending digital representations of images or layering analog images.

Viewers of one feed may use devices, such as eyewear, that renders the wavelength band of the other feed imperceptible to the eye of the viewer. For example, the lenses of the glasses may comprise optical filters that absorb, or otherwise reflect, wavelengths of light falling outside of the desired band. In that regard, if viewer 2031 wanted to view video feed 2001 but not video feed 2002, and if video feed 2002 was processed into the blue spectrum, the viewer may wear glasses 2041 having blue lenses (i.e., the lenses do not pass wavelengths falling within the blue spectrum or otherwise render the blue-hued various objects rendered in video feed 2020 imperceptible from the other objects in the feed). Similarly, viewer 2032 of the second video feed 2002 may wear glasses 2042 having lenses that do not pass light falling within the first band. In that regard, the two viewers of the system and method described in connection with FIG. 20 could simultaneously watch two different video feeds.

As noted above, the system and method is not limited to the blue and red spectrum examples set for the above. The image processing system and eyewear may be configured to filter or transmit broader or narrower bands of wavelengths. For example, glasses 2031 may pass all or a large portion of the wavelengths below a wavelength that lies at midway within the spectrum of visible light (e.g., 570 nm (yellow)). Conversely, glasses 2303 may pass all or a large portion of the wavelengths above such a wavelength.

Figure 21:
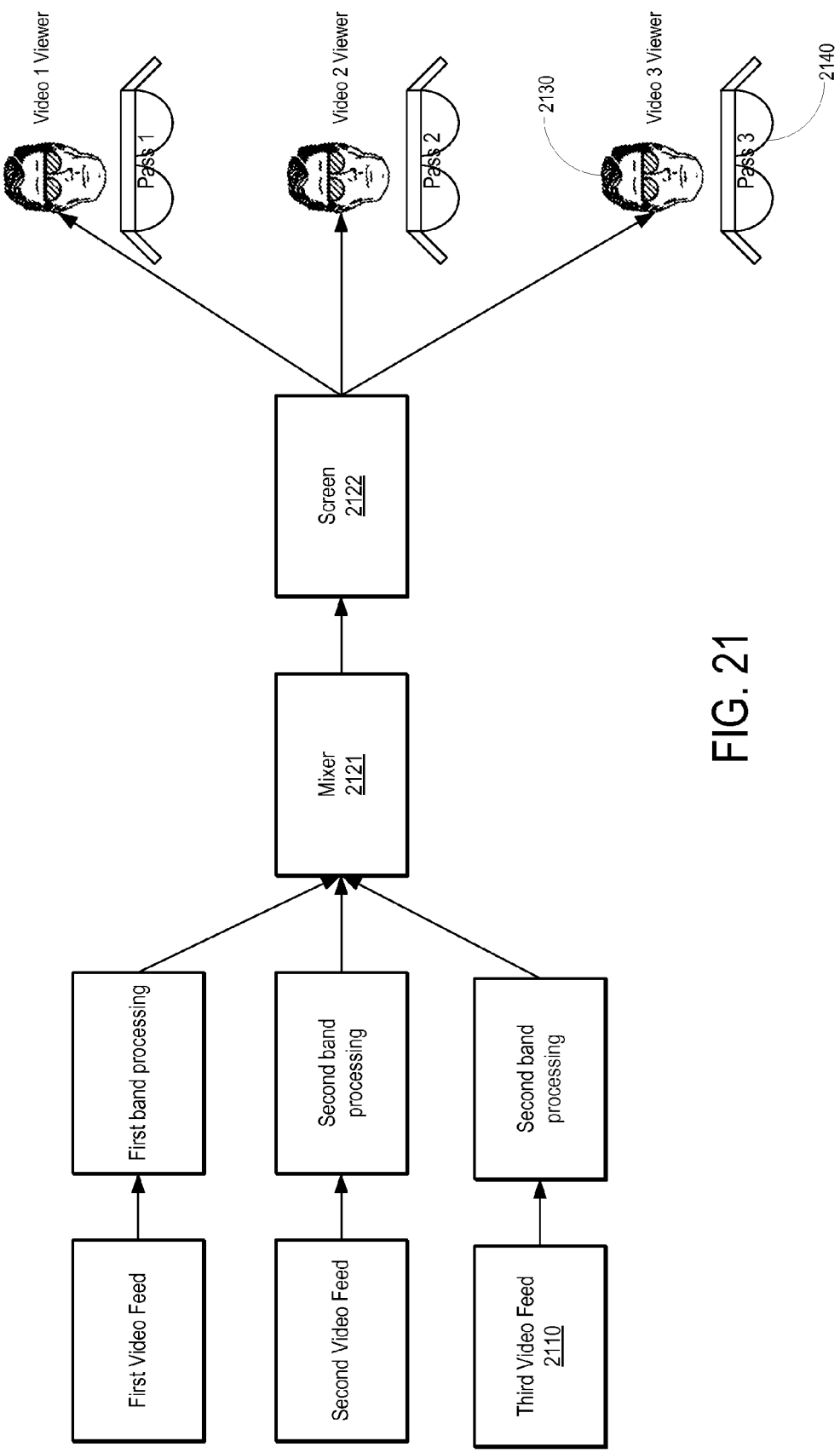
FIG. 21 is a functional diagram of three video feeds processed in accordance with bands of wavelength, in accordance with an aspect of the invention.

Additional bands may be used as well. For instance, as shown in FIG. 21, a third video feed 2110 may be processed in accordance with a third band, and viewed by a viewer 2130 using glasses 2140 that only pass light falling within the third band. The bands may also overlap such that the lower and upper bound of the first band's range of wavelengths are less than and greater than, respectively, the lower and upper bound of the second band. The bands may also overlap such that lower bound of the first band is between the lower bound and upper bound of the second band. Moreover, even if the filter of the first glasses permitted some portion of the second band to come through (and thus allow portions of the second feed to be discerned by the user), the level of attenuation of the second video feed may be such that the first video feed is much more prominent to the user than the second video feed.

In one aspect, the glasses do not require external power or electrical devices to operate. Rather, if the glasses use optical filters as noted above, the glasses may be used without additional apparatus to selectively view the processed and mixed video feeds. However, the glasses may also include components that dynamically change the color, such as transparent LCD screens that can selectively pick different colors such as red and blue. The colors to use may be provided to the eyewear by the device feeding the display, e.g., a game console may wireless and selectively transmit to the glasses the colors that they should filter. Yet further, the bands may extend beyond the range of visible light and the glasses may be capable of displaying such ranges (such as infrared video cameras). The glasses may further include speakers and receive audio as described above.

Figure 22:
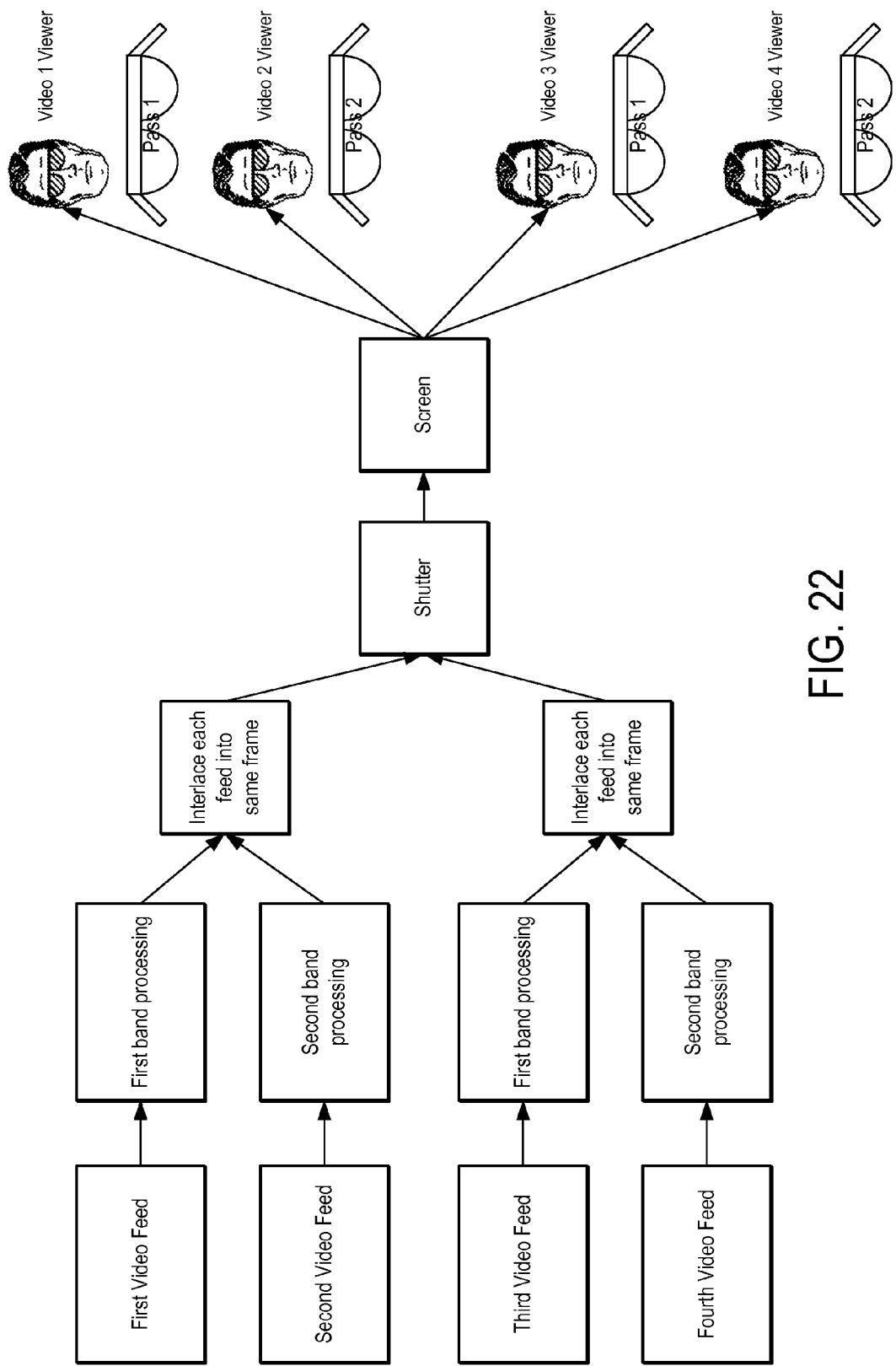
FIG. 22 is a functional diagram of four video feeds processed in accordance with bands of wavelength and shuttered glasses in accordance with an aspect of the invention.

In another aspect, glasses with a photonic filter may be used in combination with shutter glasses as disclosed above. By way of example, as shown in FIG. 22, first and second video feeds may be processed so as to only include colors within a first and second band of wavelengths, respectively. The first and second video feeds may then be interlaced together into the same frame. Similarly, a third and fourth video feed may be processed so as to only include colors within the same first and second bands of wavelengths, respectively. The third and fourth video feeds may then be interlaced together into the same frame as well. The two resultant pairs of feeds (i.e., the combined feed of first and second feeds and the combined feed of the third and fourth feeds) may then be alternately displayed on the same screen.

The glasses used by the viewers shown in FIG. 22 may contain filters and shuttering components that correspond with the various feeds. For example, to watch the first video feed, one set of glasses may filter the second band and shutter when the interlaced image of the third and fourth feed are being displayed. To watch the second video feed, another set of glasses may filter the first band and also shutter when the interlaced image of the third and fourth feed are being displayed. To watch the third video feed, yet another set of glasses may filter the first band but shutter when the interlaced image of the first and second feed are being displayed. The glasses for the viewing the fourth video feed may filter the second band and also shutter when the interlaced image of the first and second feed are being displayed.

Figure 23:
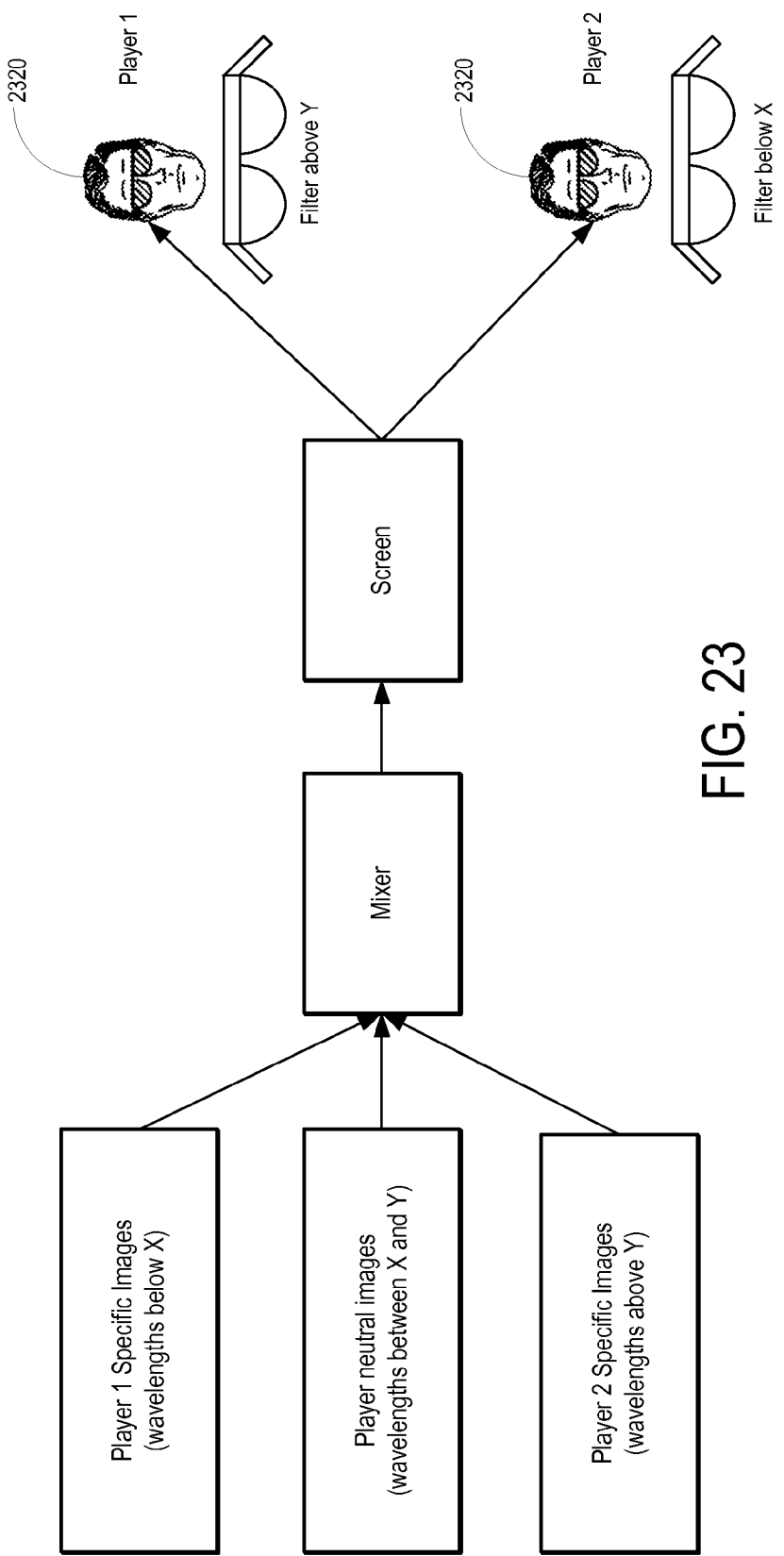
FIG. 23 is a functional diagram of a video feed containing images of different wavelengths in accordance with an aspect of the invention.

In still another aspect, the system simultaneously displays video containing information that can be seen by only one of the viewers and other information that can be seen by all of the viewers. By way of example only and as shown in FIG. 23, the image displayed on the screen may include some images that both users can see; these images may be shown as colors falling within an intermediate range of wavelengths. The image may also include one or more objects that are intended for only one of the viewers; these images may be shown as colors have wavelengths above the intermediate range of wavelengths. The image may further include one or more objects that are intended only for the other viewer; these images may be shown as colors have wavelengths above the intermediate range of wavelengths.

As further shown in FIG. 23, the range of wavelengths passed by the different glasses may overlap in some respects. For example, the glasses worn by player 2310 may pass the entire spectrum of visible light except the portion above the intermediate range. The glasses worn by player 2320 may pass the entire spectrum of visible light except the portion below the intermediate range. Accordingly, if the intermediate band comprises nearly the entire range of wavelengths of visible light, each player may see a wide range of colors yet still see some images that the other player cannot see. For instance, a fighting game may display a scene of visible objects. Most of the objects, such as the players' characters and background, may be colored so that they are visible to both players. However, a portion of each video frame may display text describing the first player's character's health, and the text may be colored such that only the first player may see it. The system may similarly display selectively colored text or other images that only the second player can see.

Accordingly, in some aspects, the band used to process a video feed and the band passed by the glasses are used to view the video feed may overlap but are otherwise not be equal. By way of further example, the video processor may shift the colors of a feed into a band that is broader than the band passed by the glasses used to view the feed.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An apparatus for providing respective video feeds to at least two viewers comprising:
   a control unit operable to control a display to display a first plurality of images from a first video feed and a second plurality of images from a second video feed, the first video feed comprising a first plurality of video frames and the second video feed comprising a second plurality of video frames, wherein:
   the first plurality of video frames includes the first plurality of images;
   the second plurality of video frames includes the second image;
   the first plurality of images from the first video feed are displayed within a first wavelength band, the colors of the first video feed having been shifted and limited within the first wavelength band by analyzing color information associated with pixels of each video frame of the first plurality of video frames and modifying the pixels of each video frame of the first plurality of video frames to be within the first wavelength band based on the analysis;
the second plurality of images from the second video feed is displayed within a second wavelength band, the colors of the second video feed having been shifted and limited within the second wavelength band by analyzing color information associated with pixels of each video frame of the second plurality of video frames and modifying the pixels of each video frame of the second plurality of video frames to be within the second wavelength based on the analysis;
a first viewer viewing the display using a first filter that passes through the first wavelength band and not passing the second wavelength band views only the first plurality of images from the first video feed; and
a second viewer viewing the display using a second filter that passes through the second wavelength band and not passing the first wavelength band views only the second plurality of images from the second video feed.

2. The apparatus of claim 1, wherein the first wavelength comprises red light and the second wavelength comprises blue light.

3. The apparatus system of claim 1, wherein the control unit comprises a device selected from a group comprising: a set-top box, a game unit, and a video player.

4. The apparatus of claim 1, wherein the first video feed further comprises a first video game signal and the second video feed further comprises a second video game signal.

5. The apparatus of claim 1, wherein control unit is further operable to:
control the display of the first video feed during a first frame such that the second video feed is not displayed; and,
control the display of the second video feed during a subsequent second frame such that the first video feed is not displayed.

6. The apparatus of claim 1, wherein:
a first image from the first plurality of images is assigned a first set of pixels;
a second image from the second plurality of images is assigned a second set of pixels; and,
the control unit is further operable to control the display of the first image and the second image such that the first set of pixels and the second set of pixels are displayed simultaneously.

7. The apparatus of claim 1, wherein:
the first video feed comprises a third image having a third wavelength band;
the second video feed comprises the third image having the third wavelength band; and,
the control unit is further operative to:
control the display to display the third image from the first video feed; and,
control the display to display the third image from the second video feed.

8. The apparatus of claim 7, wherein:
the first viewer viewing the display using the first filter views the third image from the first video feed; and
the second viewer viewing the display using the second filter views the third image from the second video feed.

9. A method for displaying multiple video feeds, the method comprising:
receiving a first video feed comprising a first plurality of video frames, the first plurality of video frames comprising a first plurality of images;
receiving a second video feed comprising a second plurality of video frames, the second plurality of video frames comprising a second plurality of images;
analyzing color information associated with pixels of each video frame of the first plurality of video frames;
shifting colors of the first video feed into a first wavelength band by modifying pixels of the first video feed based on the analyzed color information;
analyzing color information associated with pixels of each video frame of the second plurality of video frames;
shifting colors of the second video feed into a second wavelength band by modifying pixels of the second video feed based on the analyzed color information;
displaying the first plurality of images from the first video feed on a display; and,
displaying the second plurality of images from the second video feed on the display; wherein:
a first viewer viewing the display using a first filter that passes through the first wavelength band and does not pass through the second wavelength band views only the first plurality of images from the first video feed; and
a second viewer viewing the display using a second filter that passes through the second wavelength band and does not pass through the first wavelength band views only the second plurality of images from the second video feed.

10. The method of claim 9, wherein the first wavelength band comprises red light and the second wavelength band comprises blue light.

11. The method of claim 9, wherein:
displaying the first plurality of images from the first video feed on a display and displaying the second plurality of images from the second video feed on the display is controlled by a device selected from a group comprising: a set-top bix, a game unit,yand a video pla er.

12. The method of claim 9, wherein the first video feed further comprises a first video game signal and the second video feed further comprises a second video game signal.

13. The method of claim 9, further comprising:
displaying the first video feed during a first frame such that the second video feed is not displayed; and,
displaying the second video feed during a subsequent second frame such that the first video feed is not displayed.

14. The method of claim 9, further comprising:
assigning a first set of pixels to a first image from the first plurality of images;
assigning a second set of pixels to a second image from the second plurality of images; and,
displaying, on the display, the first set of pixels and the second set of pixels simultaneously.

15. The method of claim 9, wherein:
the first video feed comprises a third image having a third wavelength band; and,
the second video feed comprises the third image having the third wavelength band; and,
further comprising:
displaying the third image from the first video feed and the third image from the second video feed simultaneously.

16. The method of claim 15, wherein:
the first viewer viewing the display using the first filter views the third image from the first video feed; and
the second viewer viewing the display using the second filter views the third image from the second video feed.

17. An apparatus for displaying multiple video feeds, the apparatus comprising:

a first device operative to pass through a first range of wavelengths and attenuate at least a portion of a second range of wavelengths;

a second device operative to pass through the second range of wavelengths and attenuate at least a portion of the first range of wavelengths; and, a processor operative to:

control a display of a first plurality of images from a first video feed comprising the first range of wavelengths, the first video feed comprising a first plurality of video frames corresponding to the first plurality of images, wherein:

pixel modification has shifted at least one color of the first plurality of images of the first video feed to the first range of wavelengths, the pixel modification having been performed based on an analysis of color information associated with pixels of each video frame of the first plurality of video frames; and, control a display of a second plurality of images from a second video feed comprising the second range of wavelengths, the second video feed comprising a second plurality of video frames corresponding to the second plurality of images, wherein:

pixel modification has shifted at least one color of the second plurality of images of the second video feed to the second range of wavelengths, the pixel modification having been performed based on an analysis of color information associated with pixels of each video frame of the second plurality of video frames.

18. The apparatus of claim 17, wherein:

at least one image of the first plurality of images is more prominently displayed to a first viewer viewing the at least one image and at least one image from the second plurality of images using the first device; and, the at least one image of the second plurality of images is more prominently displayed to a second viewer viewing the at least one image of the first plurality of images and the at least one image from the second plurality of images using the second device.

19. The apparatus of claim 17, wherein the first device comprises glasses with an optical filter.

20. The apparatus of claim 17, wherein the second device comprises glasses with an optical filter.

21. The apparatus of claim 17, wherein the processor is further operative to:

control the display of the first video feed during a first frame such that the second video feed is not displayed; and, control the display of the second video feed during a subsequent second frame such that the first video feed is not displayed.

22. The apparatus of claim 17, wherein:

a first set of pixels are assigned to a first image from the first plurality of images;

a second set of pixels are assigned to a second image; from the second plurality of images and, the processor is further operative to control a display of the first set of pixels and the second set of pixels simultaneously.

23. The apparatus of claim 17, wherein:

the first video feed comprises a third image having a third range of wavelengths; and, the second video feed comprises the third image having the third range of wavelengths; and, the process is further operative to control the display of the third image from the first video feed and control the display of the third image from the second video feed.

24. The apparatus of claim 23, wherein:

a first viewer viewing the display using the first device views the third image from the first video feed; and a second viewer viewing the display using the second device views the third image from the second video feed.

25. A method for displaying multiple video feeds, the method comprising:

displaying a first plurality of images from a first video feed on a display, the first video feed comprising a first plurality of video frames corresponding to the first plurality of images; and, displaying a second plurality of images from a second video feed on the display, the second video feed comprising a second plurality of video frames corresponding to the second plurality of images;

analyzing color information associated with pixels of each video frame of the first video frame;

shifting, by pixel modification, at least one color of the first plurality of images from the first video feed into a first range of wavelengths, the pixel modification being performed based on the analyzed color information;

analyzing color information associated with pixels of each video frame of the second video frame;

shifting, by pixel modification, at least one color of the second plurality of images from the second video feed into a second range of wavelengths, the pixel modification being performed based on the analyzed color information;

passing through the first range of wavelengths and attenuating at least a portion of the second range of wavelengths;

passing through the second range of wavelengths and attenuating at least a portion of the first range of wavelengths;

wherein:

the first video feed comprises the first range of wavelengths;

the second video feed comprises the second range of wavelengths;

at least one image from the second plurality of images appears attenuated to a first viewer viewing the first video feed; and, at least one image from the first plurality of images appears attenuated to a second viewer viewing the second video feed.

26. The method of claim 25, wherein:

the at least one image of the first plurality of images is more prominently displayed to a first viewer viewing the first video feed; and, the at least one image of the second plurality of images is more prominently displayed to a second viewer viewing the second video feed.

27. The method of claim 25, further comprising:

displaying the first video feed during a first frame such that the second video feed is not displayed; and, displaying the second video feed during a subsequent second frame such that the first video feed is not displayed.

28. The method of claim 25, wherein passing through a first range of wavelengths and attenuating at least a portion of a second range of wavelengths is performed by a device comprising glasses with an optical filter.

29. The method of claim 25, wherein passing through the second range of wavelengths and attenuating at least a portion of the first range of wavelengths is performed by a device comprising glasses with an optical filter.

30. The method of claim 25, wherein:
   assigning a first set of pixels to the at least one image of the first plurality of images;
   assigning a second set of pixels to the at least one image of the second plurality of images; and,
   further comprising:
      displaying the first set of pixels and the second set of pixels simultaneously.

31. The method of claim 25, wherein:
   the first video feed comprises a third image having a third range of wavelengths; and, the second video feed comprises the third image having the third range of wavelengths; and,
   further comprising:
      displaying the third image from the first video feed and the third image from the second video feed simultaneously.

32. The method of claim 31, wherein:
   the first viewer views the third image from the first video feed; and the second viewer views the third image from the second video feed.

33. A system for displaying multiple video feeds, the system comprising:
   a plurality of human-wearable glasses comprising first glasses and second glasses, wherein:
      the first glasses are wearable by a person and the second glasses are wearable by a different person;
      the first glasses comprise an optical filter that attenuates a second color range; and,
      the second glasses comprise an optical filter that attenuates a first color range; and,
   a processor operative to substantially simultaneously display, on a common display, images from a first video feed including colors within the first color range and different images from a second video feed including colors within the second color range, wherein:
      pixels of at least one frame from the first video feed has been analyzed for first color information;
      at least one color of the images from the first video feed has been shifted by pixel modification into the first color range, the shifting of the at least one color having been performed based on the analyzed first color information;
      pixels of at least one frame from the second video feed has been analyzed for second color information;
      at least one color of the images from the second video feed has been shifted by pixel modification into the second color range, the shifting of the at least one color having been performed based on the analyzed second color information;
      a person wearing the first glasses perceives the images from the first video feed more prominently than the images from the second video feed; and,
      a person wearing the second glasses perceives the images from the second video feed more prominently than the images from the first video feed.

* * * * *

UNITED STATES PATENT AND TRADEMARK OFFICE
CERTIFICATE OF CORRECTION

Page 1 of 1

PATENT NO. : 8,665,291 B2
APPLICATION NO. : 12/836044
DATED : March 4, 2014
INVENTOR(S) : Gary Zalewski It is certified that error appears in the above-identified patent and that said Letters Patent is hereby corrected as shown below:

In the Claims

Column 14, line 36, Claim 11, "bix" should read -- box --.
Column 14, line 36, Claim 11, "unit,yand" should read -- unit, and --.
Column 14, line 36, Claim 11, "pla er" should read -- player --.

Signed and Sealed this
Eighteenth Day of August, 2015

Michelle K. Lee
*Director of the United States Patent and Trademark Office*